United States Patent
Wang (10) Patent No.: US 9,378,698 B2
(45) Date of Patent: Jun. 28, 2016

(54) PIXEL DRIVING CIRCUIT AND METHOD, ARRAY SUBSTRATE AND LIQUID CRYSTAL DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Baoqiang Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 6 days.

(21) Appl. No.: 14/364,185

(22) PCT Filed: Oct. 30, 2013

(86) PCT No.: PCT/CN2013/086224
§ 371 (c)(1),
(2) Date: Jun. 10, 2014

(87) PCT Pub. No.: WO2015/010382
PCT Pub. Date: Jan. 29, 2015

(65) Prior Publication Data
US 2015/0116308 A1    Apr. 30, 2015

(30) Foreign Application Priority Data
Jul. 26, 2013  (CN) .......................... 2013 1 0320768

(51) Int. Cl.
*G09G 3/36*     (2006.01)
*G02F 1/133*    (2006.01)
*G02F 1/1368*   (2006.01)

(52) U.S. Cl.
CPC ............ *G09G 3/3677* (2013.01); *G02F 1/1368* (2013.01); *G02F 1/13306* (2013.01); *G09G3/3659* (2013.01); *G09G 2300/08* (2013.01); *G09G 2310/0205* (2013.01); *G09G 2310/0208* (2013.01); *G09G 2310/0251* (2013.01); *G09G 2320/02* (2013.01); *G09G 2320/0252* (2013.01)

(58) Field of Classification Search
USPC ..................................................... 345/214, 98
See application file for complete search history.

(56) References Cited

U.S. PATENT DOCUMENTS

| | | | |
|---|---|---|---|
| 7,561,138 B2 * | 7/2009 | Byun | G09G 3/3677 345/87 |
| 2007/0146288 A1 | 6/2007 | Byun | |
| 2008/0024418 A1 * | 1/2008 | Kim | G09G 3/3648 345/98 |

FOREIGN PATENT DOCUMENTS

| | | |
|---|---|---|
| CN | 1755467 A | 4/2006 |
| CN | 1991963 A | 7/2007 |

OTHER PUBLICATIONS

International Search Report for International Application No. PCT/CN2013/086224 issued on May 6, 2014, 12pgs.

(Continued)

*Primary Examiner* — Jason Olson
*Assistant Examiner* — Deeprose Subedi
(74) *Attorney, Agent, or Firm* — Ladas & Parry LLP (57) ABSTRACT

A pixel driving circuit and method, an array substrate and a LCD apparatus, solve the problem of a deterioration of an image quality due to an insufficient charging to a pixel electrode when a refreshing frequency of the LCD is relatively high. The pixel driving circuit comprises n rows of scanning lines, where n is an integer and n≥3, and the pixel driving circuit further comprises a pre-charging unit connected to each row of scanning line, for activating the $(i+2)^{th}$ row of scanning line at the same time when the $i^{th}$ row of scanning line is activated, where i is an integer and $1 \leq i \leq n-2$. The array substrate comprises a number of pixel units distributed in a matrix, and further comprises the pixel driving circuit as described above. The LCD apparatus comprises the array substrate as described above. The pixel driving method is used for driving n rows of scanning lines, where n is an integer and n≥3, and activating the $(i+2)^{th}$ row of scanning line at the same time when the $i^{th}$ row of scanning line is activated, where i is an integer and $1 \leq i \leq n-2$.

6 Claims, 4 Drawing Sheets

(56) References Cited

OTHER PUBLICATIONS

The State Intellectual Property Office of the People's Republic of China ("SIPO") (Chinese Language) Office Action issued on Dec. 29, 2014 by SIPO in Chinese Patent Application No. 201310320768. 2; 6 pages.

English Translation of The State Intellectual Property Office of the People's Republic of China ("SIPO") Office Action issued on Dec. 29, 2014 by SIPO in Chinese Patent Application No. 201310320768. 2; 5 pages.

English abstract of CN1755467(A) listed above; 1 page.

International Preliminary Report on Patentability Appln. No. PCT/CN2013/086224.

* cited by examiner

101 — activating the (i+2)$^{th}$ row of the scanning line at the same time when the i$^{th}$ row of the scanning line is activated

PIXEL DRIVING CIRCUIT AND METHOD, ARRAY SUBSTRATE AND LIQUID CRYSTAL DISPLAY APPARATUS

CROSS REFERENCE TO RELATED APPLICATIONS

This application is based on International Application No. PCT/CN2013/086224 filed on Oct. 30, 2013, which claims priority to Chinese National Application No. 201310320768.2 filed on Jul. 26, 2013. The entire contents of each and every foregoing application are incorporated herein by reference.

TECHNICAL FIELD OF THE DISCLOSURE

The present disclosure relates to the technical field of Liquid Crystal Display (LCD), and particularly to a pixel driving circuit and method, an array substrate and a LCD apparatus.

BACKGROUND

Figure 1:
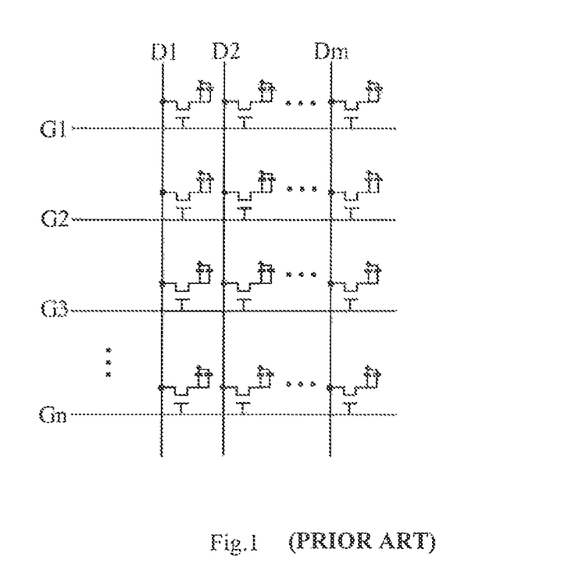
FIG. 1 is a schematic diagram of a pixel driving circuit as known.

A driving method of a progressive scanning is generally employed by current LCDs to realize the image display. As shown in FIG. 1, an array substrate in a current LCD includes a number of pixel units defined by multiple rows of scanning lines Gn and multiple columns of data lines Dm intersected with each other, each of which includes a pixel electrode. The pixel driving method includes the following steps particularly: first, the first row of scanning line G1 is activated, and the pixel electrodes of the first row are charged by the data line; then, the second row of scanning line G2 is activated while the first row of scanning line G1 is deactivated, and the pixel electrodes of the second row are charged by the data line, and so on.

The higher the refreshing frequency of the LCD is, the shorter the time when each row of scanning line keeps active is. Therefore, the charging to the pixel electrode may be insufficient when the refreshing frequency of the LCD is relatively high.

SUMMARY

In view of the technical problem in the prior art as described above, the present disclosure provides a pixel driving circuit and method, an array substrate and a LCD apparatus, which solves the problem of a deterioration of an image quality due to the insufficient charging to the pixel electrode when the refreshing frequency of the LCD is relatively high.

In order to solve the above technical problem, the following technical solutions may be employed in the present disclosure.

In an aspect, a pixel driving circuit comprising n rows of scanning lines is provided, where n is an integer and n≥3, the pixel driving circuit further comprises:

a pre-charging unit connected to each row of scanning line, for activating the $(i+2)^{th}$ row of scanning line at the same time when the $i^{th}$ row of scanning line is activated, where i is an integer and 1≤i≤n−2.

In particular, the pre-charging unit comprises:

n−2 pre-charging thin film transistors, in which a source of the $i^{th}$ pre-charging thin film transistor is connected to the $i^{th}$ row of scanning line, a drain of the $i^{th}$ pre-charging thin film transistor is connected to a first node on the $(i+2)^{th}$ row of scanning line, gates of the $(4j+1)^{th}$ and the $(4j+2)^{th}$ pre-charging thin film transistors are connected to an input terminal of first clock signal, and gates of the $(4j+3)^{th}$ and the $(4j+4)^{th}$ pre-charging thin film transistors are connected to an input terminal of second clock signal, n≥6, 1≤i≤n−4, j is an integer and j≥0;

the input terminal of first clock signal is used for inputting the first clock signal with a scanning time of two rows as a half cycle, and the input terminal of second clock signal is used for inputting the second clock signal opposite to the first clock signal.

Further, the pre-charging unit also comprises:

n−2 first thin film transistors and second thin film transistors;

a source of the $i^{th}$ first thin film transistor is connected to the $i^{th}$ row of scanning line, a drain of the first $i^{th}$ thin film transistor is connected to an input terminal of turn-off level, and a gate of the $i^{th}$ thin film transistor is connected to a second node on the $(i+2)^{th}$ row of scanning line;

the first node is located between an input terminal of scanning line and a pixel electrode and the second node is located between the input terminal of scanning line and the first node, on the $(i+2)^{th}$ row of scanning line; and the $i^{th}$ second thin film transistor is connected between the first node and the second node of the $(i+2)^{th}$ row of scanning line in series, a source and a gate of the $i^{th}$ second thin film transistor are connected to the second node, and a drain of the $i^{th}$ second thin film transistor is connected to the first node.

In another aspect, an array substrate is provided, comprising a number of pixel units distributed in a matrix, and further comprising the pixel driving circuit as described above.

In a further aspect, a liquid crystal display apparatus is provided, comprising the array substrate as described above.

In still another aspect, a pixel driving method for driving n rows of scanning lines is provided, wherein n is an integer and n≥3, the pixel driving method comprising:

activating the $(i+2)^{th}$ row of scanning line at the same time when the $i^{th}$ row of scanning line is activated, wherein i is an integer and 1≤i≤n−2.

In particular, the process of activating the $(i+2)^{th}$ row of scanning line at the same time when the $i^{th}$ row of scanning line is activated comprises:

supplying a turn-on level by an input terminal of first clock signal to turn on the $(4j+1)^{th}$ pre-charging thin film transistor when the $(4j+1)^{th}$ row of scanning line is activated;

supplying the turn-on level by the input terminal of first clock signal to turn on the $(4j+2)^{th}$ pre-charging thin film transistor when the $(4j+2)^{th}$ row of scanning line is activated;

supplying the turn-on level by an input terminal of second clock signal to turn on the $(4j+3)^{th}$ pre-charging thin film transistor and supplying a turn-off level by the input terminal of first clock signal to turn off the $(4j+1)^{th}$ pre-charging thin film transistor, when the $(4j+3)^{th}$ row of scanning line is activated; and supplying the turn-on level by the input terminal of second clock signal to turn on the $(4j+4)^{th}$ pre-charging thin film transistor and supplying the turn-off level by the input terminal of first clock signal to turn off the $(4j+2)^{th}$ pre-charging thin film transistor, when the $(4j+4)^{th}$ row of scanning line is activated;

where j is an integer and j≥0.

The pixel driving circuit and method, the array substrate and the LCD apparatus provided in the embodiments of the present disclosure pre-charge the pixel electrodes of the $(i+2)^{th}$ row by setting the pre-charging unit to activate the $(i+2)^{th}$ row of scanning line at the same time when the $i^{th}$ row of scanning line is activated. Since a difference between a charging voltage in a current frame and a pre-charging voltage of the pixel electrode is smaller than a difference between the charging voltage in the current frame and the charging voltage in a previous frame, a difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

BRIEF DESCRIPTION OF THE DRAWINGS

In order to illustrate the technical solutions in the embodiments of the present disclosure more clearly, a brief introduction will be given to the accompanying drawings required for describing the embodiments of the present disclosure or the prior art. Obviously, the accompanying drawings described as below are only some of the embodiments of the present disclosure, and those skilled in the art can obtain other accompanying drawings from the drawings described without paying any inventive labor.

DETAILED DESCRIPTION

Hereinafter, the technical solutions in the embodiments of the present disclosure will be described clearly and thoroughly with reference to the accompanying drawings of the embodiments of the present disclosure. Obviously, the embodiments as described are only a part, but not all, of the embodiments of the present disclosure. All other embodiments obtained by those skilled in the art based on the embodiments in the present disclosure without paying any inventive work shall fall within the protection scope of the present disclosure.

The current LCD drives pixels generally by using a dot inversion in which a voltage polarity of each pixel unit is opposite to the voltage polarities of pixel units adjacently at the upper side, the lower side, the left side and the right side, and by using a polarity inversion in which polarities of each pixel electrode are opposite in two adjacent frames, which results in a relatively large voltage difference between a charging voltage and a voltage in a previous frame of the pixel electrode when the pixel electrode is charged, and a long charging time required to change the voltage in the previous frame into the charging voltage. The embodiments of the present disclosure provides a new pixel driving circuit and method, an array substrate and a LCD apparatus based on the polarity inversion and the dot inversion technology.

First Embodiment

Figure 2:
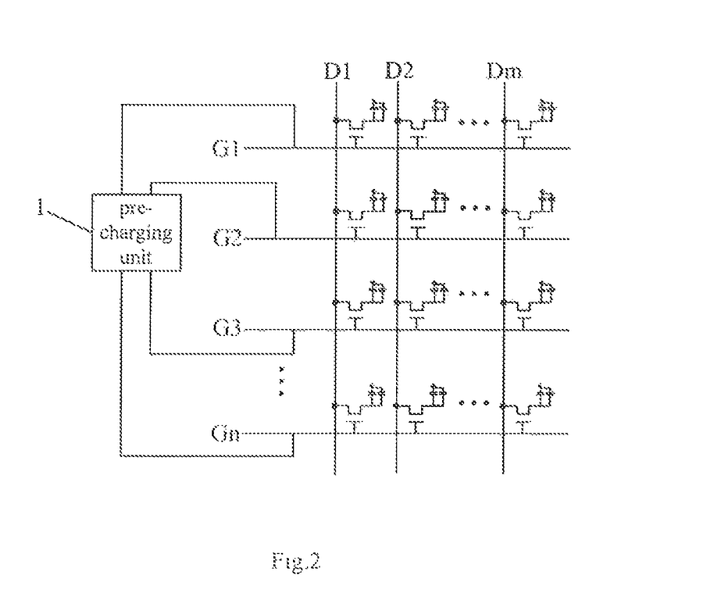
FIG. 2 is a schematic diagram of a pixel driving circuit in a first embodiment of the present disclosure.

As shown in FIG. 2, a pixel driving circuit for a LCD apparatus is provided in the embodiment of the present disclosure, which comprises n rows of scanning lines G1, G2, G3, . . . , Gn, where n is an integer and n≥3. The n rows of scanning lines and m columns of data lines D1, D2, . . . , Dm define a number of pixel units by intersection. Each of the pixel unit comprises a pixel electrode. The pixel driving circuit further comprises: a pre-charging unit 1 connected to each row of scanning line, for activating the $(i+2)^{th}$ row of scanning line at the same time when the $i^{th}$ row of scanning line is activated, where i is an integer and 1≤i≤n−2.

Specifically, at first, the first row of scanning line G1 is activated, and the pixel electrodes of the first row are charged by the data line. At the same time, since the third row of scanning line G3 is also activated, the pixel electrodes of the third row are pre-charged by the data line simultaneously. Then, the second row of scanning line G2 and the fourth row of scanning line G4 are activated simultaneously, and the pixel electrodes of the fourth row are pre-charged at the same time when the pixel electrodes of the second row are charged, by the data line. Then, the third row of scanning line G3 and the fifth row of scanning line G5 are activated simultaneously, and the pixel electrodes of the fifth row are pre-charged at the same time when the pixel electrodes of the third row are charged, by the data line. By analogy, the scanning of all rows is completed.

Since the voltage polarity of each pixel unit is opposite to those of the adjacent pixel units at the upper side, the lower side, the left side and the right side in the dot inversion technology, the voltage polarities of the pixel electrodes at the corresponding locations of the two adjacent rows are opposite to each other. In the embodiment of the present disclosure, the pixel electrodes of the $(i+2)^{th}$ row are pre-charged by activating the $i^{th}$ row and the $(i+2)^{th}$ row of scanning lines simultaneously. Since the voltage of the pixel electrodes of the $i^{th}$ row in the current frame has been inverted in polarity, for a certain pixel electrode, the difference between the charging voltage in the current frame and the pre-charging voltage is smaller than the difference between the charging voltage in the current frame and the charging voltage in the previous frame. When the $(i+2)^{th}$ row of scanning line is activated, it is only required for the pixel electrodes of this row to change the voltage from the pre-charging voltage into the charging voltage. For example, the voltage of the fourth pixel electrode of the third row in the second frame is −7 v, and it is required to be changed into 9 v in the third frame. In the prior art, the voltage of the pixel electrode needs to be changed into 9 v from −7 v when the third row of scanning line is activated in the third frame; while in the pixel driving circuit provided in the embodiment of the present disclosure, the third row of scanning line is activated at the same time when the first row of scanning line is activated in the third frame, and the pixel electrode is pre-charged. For example, it is pre-charged so that the voltage of the fourth pixel electrode of the third row is changed from −7 v into 4 v, then it is only required to change the voltage of the pixel electrode from 4 v into 9 v in the third frame.

In the pixel driving circuit of the embodiments of the present disclosure, the pixel electrodes of the $(i+2)^{th}$ row are pre-charged by setting the pre-charging unit to activate the $(i+2)^{th}$ row of scanning line at the same time when the $i^{th}$ row of scanning line is activated. Since the difference between the charging voltage in the current frame and the pre-charging voltage of the pixel electrode is smaller than the difference between the charging voltage in the current frame and the charging voltage in the previous frame, the difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

Second Embodiment

Figure 3:
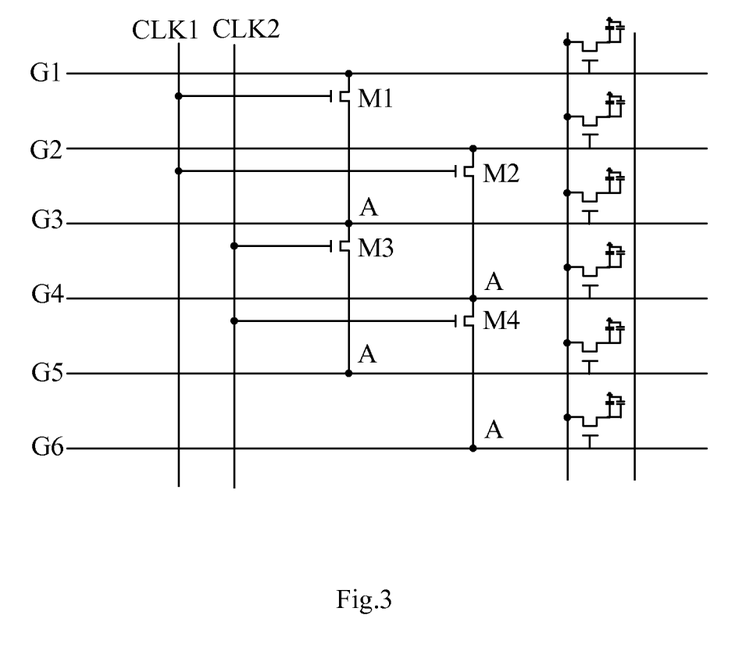
FIG. 3 is a schematic diagram of a pixel driving circuit in a second embodiment of the present disclosure.

As shown in FIG. 3, on the basis of the first embodiment, the above pre-charging unit may comprise: n−2 pre-charging thin film transistors (TFTs) M1, M2, ... Mn-2, in which a source of the $i^{th}$ pre-charging TFT Mi is connected to the $i^{th}$ row of scanning line Gi, a drain of the $i^{th}$ pre-charging TFT Mi is connected to a first node A on the $(i+2)^{th}$ row of scanning line Gi+2, gates of the $(4j+1)^{th}$ and the $(4j+2)^{th}$ pre-charging TFTs are connected to an input terminal of first clock signal CLK1, and gates of the $(4j+3)^{th}$ and the $(4j+4)^{th}$ pre-charging TFTs are connected to an input terminal of second clock signal CLK2, where $n \geq 6$, $1 \leq i \leq n-4$, j is an integer and $j \leq 0$.

Figure 4:
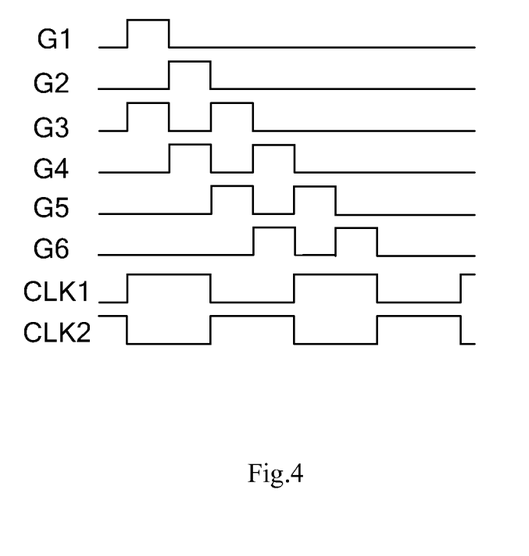
FIG. 4 is a timing chart of respective signal lines in FIG. 3.

As shown in FIG. 4, the input terminal of first clock signal CLK1 is used for inputting the first clock signal with a scanning time of two rows as a half cycle, and the input terminal of second clock signal CLK2 is used for inputting the second clock signal opposite to the first clock signal.

It is to be noted that, for convenience of the description of the structure of the pixel driving circuit and the timings of the respective signal lines, FIGS. 3 and 4 only illustrate the case in which there are only 6 rows of scanning lines. Furthermore, the timing signals of the G1, G2, ..., G6 in FIG. 4 represent the level situations on the respective scanning lines, and are not signals input from the input terminal of scanning lines.

In the following, the pixel driving circuit in the present embodiment will be further described by taking a particular pixel driving method as an example. When the scanning line G1 is activated, that is, when a turn-on level is input to the scanning line G1, the turn-on level is supplied by the input terminal of first clock signal CLK1 to turn on the M1, so that the scanning line G3 is at the turn-on level. At this time, the pixel electrodes of the third row are pre-charged at the same time when the pixel electrodes of the first row are charged, by the data line. When the scanning line G2 is activated, the turn-on level is supplied by the input terminal of first clock signal CLK1 to turn on the M2, so that the scanning line G4 is at the turn-on level. At this time, the pixel electrodes of the fourth row are pre-charged at the same time when the pixel electrodes of the second row are charged, by the data line. When the scanning line G3 is activated, the turn-on level is supplied by the input terminal of second clock signal CLK2 to turn on the M3 so that the scanning line G5 is at the turn-on level, and the turn-off level is supplied by the input terminal of first clock signal CLK1 to turn off the M1 to ensure that the scanning line G1 is at the turn-off level. At this time, the pixel electrodes of the fifth row are pre-charged at the same time when the pixel electrodes of the third row are charged, by the data line. When the scanning line G4 is activated, the turn-on level is supplied by the input terminal of second clock signal CLK2 to turn on the M4, and the turn-off level is supplied by the input terminal of first clock signal CLK1 to turn off the M2 to ensure that second row of scanning line is at the turn-off level. At this time, the pixel electrodes of the sixth row are pre-charged at the same time when the pixel electrodes of the fourth row are charged. By analogy, the scanning of all rows is completed.

It is to be noted that FIG. 4 only shows the case in which the turn-on level is a high level and the turn-off level is a low level, and the practical turn-on level and turn-off level should be determined based on the type of the TFTs. When the TFT is of the N type, the turn-on level is the high level, and the turn-off level is the low level. When the TFT is of the P type, the turn-on level is the low level, and the turn-off level is the high level.

In the pixel driving circuit of the embodiment of the present disclosure, the pixel electrodes of the $(i+2)^{th}$ row are pre-charged by setting the pre-charging unit to activate the $(i+2)^{th}$ row of scanning line at the same time when the $i^{th}$ row of scanning line is activated. Since the difference between the charging voltage in the current frame and the pre-charging voltage of the pixel electrode is smaller than the difference between the charging voltage in the current frame and the charging voltage in the previous frame, the difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

Third Embodiment

Figure 5:
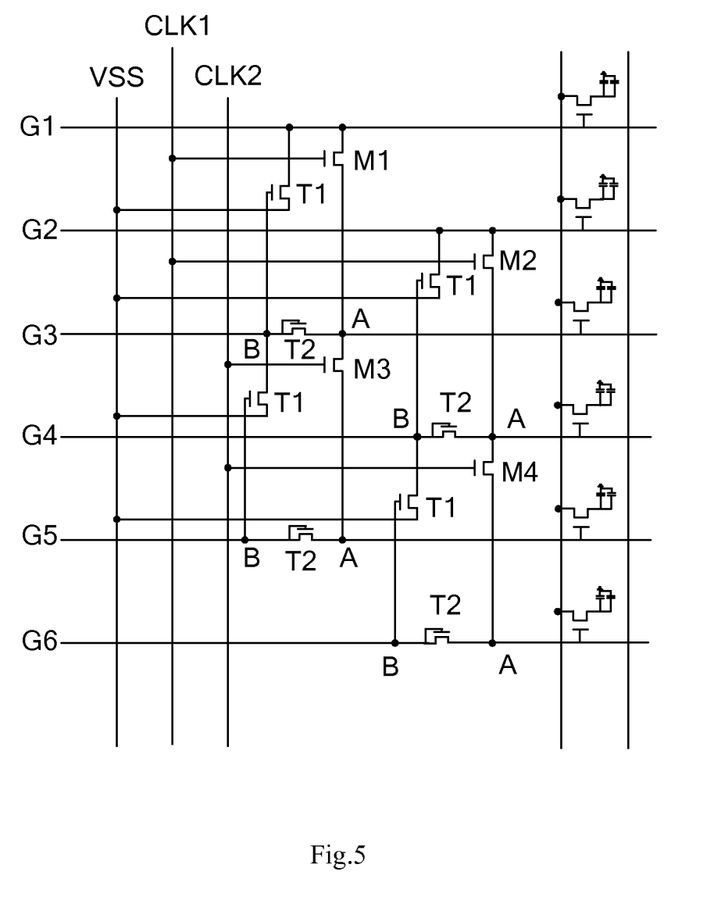
FIG. 5 is a schematic diagram of a pixel driving circuit in a third embodiment of the present disclosure.

As shown in FIG. 5, on the basis of the second embodiment, the above pre-charging unit may also include: n-2 first TFTs T1 and second TFTs T2; a source of the $i^{th}$ first TFT T1 is connected to the $i^{th}$ row of scanning line Gi, a drain of the first $i^{th}$ TFT T1 is connected to a turn-off level input terminal VSS, and a gate of the $i^{th}$ TFT T1 is connected to a second node B on the $(i+2)^{th}$ row of scanning line Gi+2; the first node A is located between an input terminal of scanning line and a pixel electrode and the second node B is located between the input terminal of scanning line and the first node A, on the $(i+2)^{th}$ row of scanning line Gi+2; and the $i^{th}$ second TFT T2 is connected in series between the first node A and the second node B of the $(i+2)^{th}$ row of scanning line, a source and a gate of the $i^{th}$ second TFT T2 are connected to the second node B, and a drain of the $i^{th}$ second TFT T2 is connected to the first node A.

The operation process and the principle of the pixel driving circuit in the present embodiment are similar to those in the second embodiment, and will not be described herein to avoid redundancy. The only difference lies in that current may pass through the pre-charging TFT between the $i^{th}$ row of scanning line and the $(i+2)^{th}$ row of scanning line when the $(i+2)^{th}$ row of scanning line is activated. At this time, the turn-on level supplied by the input terminal of $(i+2)^{th}$ row of scanning line turns on the $i^{th}$ first TFT T1, so that the turn-off level inputted by the turn-off level input terminal VSS is supplied to the $i^{th}$ row of scanning line to ensure that the $i^{th}$ row of scanning line is at the turn-off level at this time. The function of the second TFT T2 is to prevent the $(i+2)^{th}$ first TFT T1 between the $(i+2)^{th}$ row of scanning line and the $(i+4)^{th}$ row of scanning line from being turned on when the $(i+2)^{th}$ row of scanning line is activated, which results in the turn-off level being supplied to the $(i+2)^{th}$ row of scanning line to affect the charging effect of the pixel electrode.

It is to be noted that the source and the drain in the TFTs of the above embodiments may be interchanged with each other.

In the pixel driving circuit of the embodiment of the present disclosure, the pixel electrodes of the $(i+2)^{th}$ row are pre-charged by setting the pre-charging unit to activate the $(i+2)^{th}$ row of scanning line at the same time when the $i^{th}$ row of scanning line is activated. Since the difference between the charging voltage in the current frame and the pre-charging voltage of the pixel electrode is smaller than the difference between the charging voltage in the current frame and the charging voltage in the previous frame, the difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

Fourth Embodiment

An array substrate comprises a number of pixel units distributed in a matrix, and further comprises the pixel driving circuit in the respective embodiments as described above.

In the array substrate of the embodiment of the present disclosure, the pixel electrodes of the $(i+2)^{th}$ row are pre-charged by setting the pre-charging unit to activate the $(i+2)^{th}$ row of scanning line at the same time when the $i^{th}$ row of scanning line is activated. Since the difference between the charging voltage in the current frame and the pre-charging voltage of the pixel electrode is smaller than the difference between the charging voltage in the current frame and the charging voltage in the previous frame, the difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

Fifth Embodiment

There provides a LCD apparatus, comprising the array substrate in the fourth embodiment as described above.

The LCD apparatus may specifically be any product or part having a display function, such as a liquid crystal panel, a cell phone, a tablet computer, a TV, a display, a notebook computer, a digital frame, a navigation device or the like.

In the LCD apparatus of the embodiment of the present disclosure, the pixel electrodes of the $(i+2)^{th}$ row are pre-charged by setting the pre-charging unit to activate the $(i+2)^{th}$ row of scanning line at the same time when the $i^{th}$ row of scanning line is activated. Since the difference between the charging voltage in the current frame and the pre-charging voltage of the pixel electrode is smaller than the difference between the charging voltage in the current frame and the charging voltage in the previous frame, the difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

Sixth Embodiment

Figure 6:
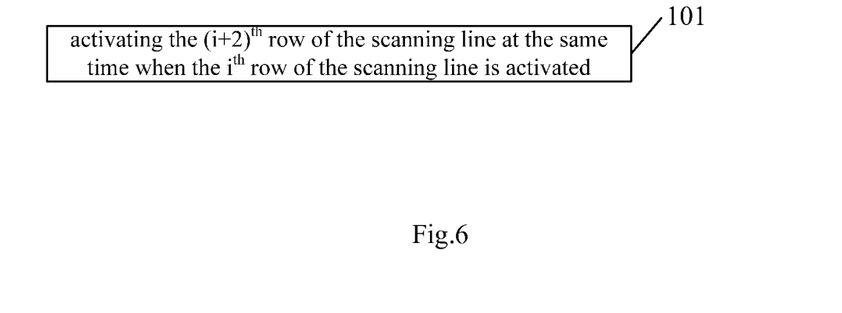
FIG. 6 is a flowchart of a pixel driving method in a sixth embodiment of the present disclosure.

A pixel driving method for driving n rows of scanning lines is provided in the present embodiment, where n is an integer and n≥3. The pixel driving method may be applied to the pixel driving circuit in the first embodiment, the second embodiment or the third embodiment. Specifically, as shown in FIG. 6, the pixel driving method comprises the following operation processes.

In a step 101, the $(i+2)^{th}$ row of scanning line is activated at the same time when the $i^{th}$ row of scanning line is activated, where i is an integer and 1≤i≤n−2.

Figure 7:
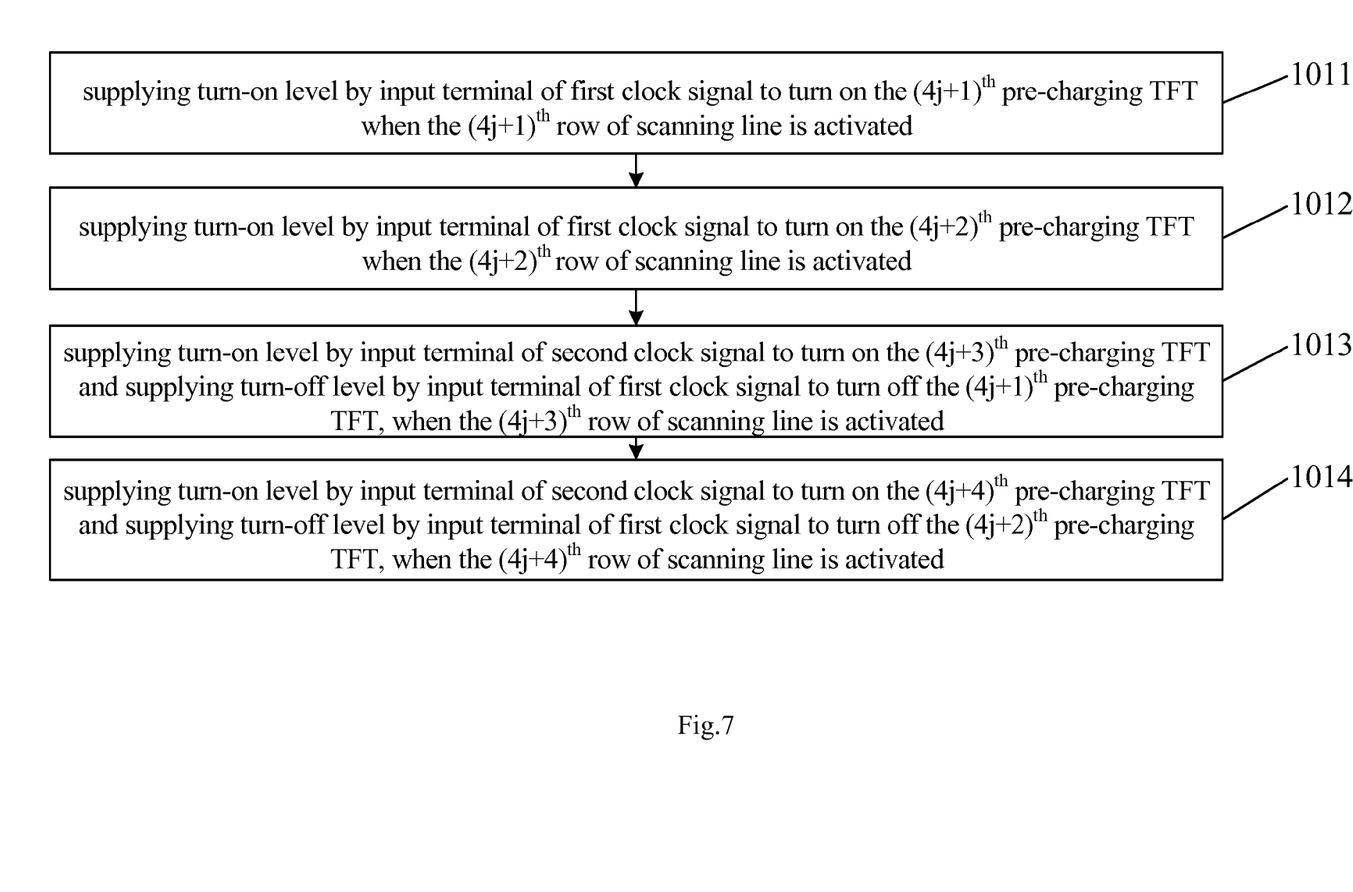
FIG. 7 is a flowchart of another pixel driving method in the sixth embodiment of the present disclosure.

Specifically, as shown in FIG. 7, in the above step 101, the process of activating the $(i+2)^{th}$ row of scanning line at the same time when the $i^{th}$ row of scanning line is activated comprises:

in a step 1011, a turn-on level is supplied by an input terminal of first clock signal to turn on the $(4j+1)^{th}$ pre-charging TFT when the $(4j+1)^{th}$ row of scanning line is activated;

in a step 1012, the turn-on level is supplied by the input terminal of first clock signal to turn on the $(4j+2)^{th}$ pre-charging TFT when the $(4j+2)^{th}$ row of scanning line is activated;

in a step 1013, the turn-on level is supplied by an input terminal of second clock signal to turn on the $(4j+3)^{th}$ pre-charging TFT and a turn-off level is supplied by the input terminal of first clock signal to turn off the $(4j+1)^{th}$ pre-charging TFT, when the $(4j+3)^{th}$ row of scanning line is activated; and in a step 1014, the turn-on level is supplied by the input terminal of second clock signal to turn on the $(4j+4)^{th}$ pre-charging TFT and the turn-off level is supplied by the input terminal of first clock signal to turn off the $(4j+2)^{th}$ pre-charging TFT, when the $(4j+4)^{th}$ row of scanning line is activated;

where j is an integer and j≥0.

The detailed operation principle and process of the pixel driving method are the same as those in the embodiments as described above, and will not be described here to avoid redundancy.

In the pixel driving method of the embodiment of the present disclosure, the pixel electrodes of the $(i+2)^{th}$ row are pre-charged by setting the pre-charging unit to activate the $(i+2)^{th}$ row of scanning line at the same time when the $i^{th}$ row of scanning line is activated. Since the difference between the charging voltage in the current frame and the pre-charging voltage of the pixel electrode is smaller than the difference between the charging voltage in the current frame and the charging voltage in the previous frame, the difference between the voltage of the pixel electrode and the charging voltage is decreased after the pre-charging, and the problem of the deterioration of the image quality due to the insufficient charging to the pixel electrode is solved when the refreshing frequency of the LCD is relatively high.

From the description of the above implementations, those skilled in the art may understand clearly that the present disclosure may be realized by software in combination with necessary general hardware, and of course may also be realized by hardware, but the former one is a better implementation in many cases.

The above descriptions are only for illustrating the embodiments of the present disclosure, and in no way limit the scope of the present disclosure. The variations or alternations that may be easily thought of by those skilled in the art within the technical scope disclosed by the present disclosure shall fall within the protection scope of the present disclosure. Therefore, the protection scope of the present disclosure shall be defined by the protection scope of the appended claims.

What is claimed is:

1. A pixel driving circuit comprising n rows of scanning lines, where n is an integer and n≥3, wherein the pixel driving circuit further comprises:

a pre-charging unit connected to each row of scanning line, for activating the $(i+2)^{th}$ row of scanning line at the same time when the $i^{th}$ row of scanning line is activated, where i is an integer and 1≤i≤n−2, wherein the pre-charging unit comprises:

n−2 pre-charging thin film transistors, in which a source of the $i^{th}$ pre-charging thin film transistor is connected to the $i^{th}$ row of scanning line, a drain of the $i^{th}$ pre-charging thin film transistor is connected to a first node on the $(i+2)^{th}$ row of scanning line, gates of the $(4j+1)^{th}$ and the $(4j+2)^{th}$ pre-charging thin film transistors are connected to an input terminal of first clock signal, and gates of the $(4j+3)^{th}$ and the $(4j+4)^{th}$ pre-charging thin film transistors are connected to an input terminal of second clock signal, where n≥6, 1≤i≤n−4, j is an integer and j≥0;

the input terminal of first clock signal is used for inputting a first clock signal with a scanning time of two rows as a half cycle, and the input terminal of second clock signal is used for inputting a second clock signal opposite to the first clock signal.

2. The pixel driving circuit of claim 1, wherein the pre-charging unit further comprises: n−2 first thin film transistors and second thin film transistors; a source of the i.sup.th first thin film transistor is connected to the i.sup.th row of scanning line, a drain of the $i^{th}$ thin film transistor is connected to an input terminal of turn-off level, and a gate of the $i^{th}$ thin film transistor is connected to a second node on the $(i+2)^{th}$ row of scanning line; the first node is located between an input terminal of scanning line and a pixel electrode and the second node is located between the input terminal of scanning line and the first node, on the $(i+2)^{th}$ row of scanning line; and the $i^{th}$ second thin film transistor is connected between the first node and the second node on the $(i+2)^{th}$ row of scanning line in series, a source and a gate of the $i^{th}$ second thin film transistor are connected to the second node, and a drain of the $i^{th}$ second thin film transistor is connected to the first node.

3. An array substrate comprising a number of pixel units distributed in a matrix, and further comprising the pixel driving circuit of claim 1.

4. A pixel driving method for driving n rows of scanning lines, where n is an integer and n.gtoreq.3, the pixel driving method comprising: activating the (i+2)th row of scanning line at the same time when the ith row of scanning line is activated, where i is an integer and $1 \le i \le n-2$, wherein the step of activating the (i+2)th row of scanning line at the same time when the ith row of scanning line is activated comprises: supplying a turn-on level by an input terminal of first clock signal to turn on the (4j+1)th pre-charging thin film transistor when the (4j+1)th row of scanning line is activated; supplying the turn-on level by the input terminal of first clock signal to turn on the (4j+2)th pre-charging thin film transistor when the (4j+2)th row of scanning line is activated; supplying the turn-on level by an input terminal of second clock signal to turn on the (4j+3)th pre-charging thin film transistor and supplying a turn-off level by the input terminal of first clock signal to turn off the (4j+1)th pre-charging thin film transistor, when the (4j+3)th row of scanning line is activated; and supplying the turn-on level by the input terminal of second clock signal to turn on the (4j+4)th pre-charging thin film transistor and supplying the turn-off level by the input terminal of first clock signal to turn off the (4j+2)th pre-charging thin film transistor, when the (4j+4)th row of scanning line is activated; where j is an integer and $j \ge 0$.

5. The array substrate of claim 3, wherein the pre-charging unit comprises:

n−2 pre-charging thin film transistors, in which a source of the $i^{th}$ pre-charging thin film transistor is connected to the $i^{th}$ row of scanning line, a drain of the $i^{th}$ pre-charging thin film transistor is connected to a first node on the $(i+2)^{th}$ row of scanning line, gates of the $(4j+1)^{th}$ and the $(4j+2)^{th}$ pre-charging thin film transistors are connected to an input terminal of first clock signal, and gates of the $(4j+3)^{th}$ and the $(4j+4)^{th}$ pre-charging thin film transistors are connected to an input terminal of second clock signal, where $n \div 6$, $1 \le i \le n-4$, j is an integer and $j \ge 0$;

the input terminal of first clock signal is used for inputting the first clock signal with a scanning time of two rows as a half cycle, and the input terminal of second clock signal is used for inputting the second clock signal opposite to the first clock signal.

6. The array substrate of claim 5, wherein the pre-charging unit further comprises:

n−2 first thin film transistors and second thin film transistors;

a source of the $i^{th}$ first thin film transistor is connected to the $i^{th}$ row of scanning line, a drain of the first $i^{th}$ thin film transistor is connected to an input terminal of turn-off level, and a gate of the $i^{th}$ thin film transistor is connected to a second node on the $(i+2)^{th}$ row of scanning line;

the first node is located between an input terminal of scanning line and a pixel electrode and the second node is located between the input terminal of scanning line and the first node, on the $(i+2)^{th}$ row of scanning line; and the $i^{th}$ second thin film transistor is connected between the first node and the second node on the $(i+2)^{th}$ row of scanning line in series, a source and a gate of the $i^{th}$ second thin film transistor are connected to the second node, and a drain of the $i^{th}$ second thin film transistor is connected to the first node.

* * * * *